Feb. 11, 1947.  E. E. WALLACE  2,415,615
AIRPLANE
Filed Feb. 16, 1942   6 Sheets-Sheet 1
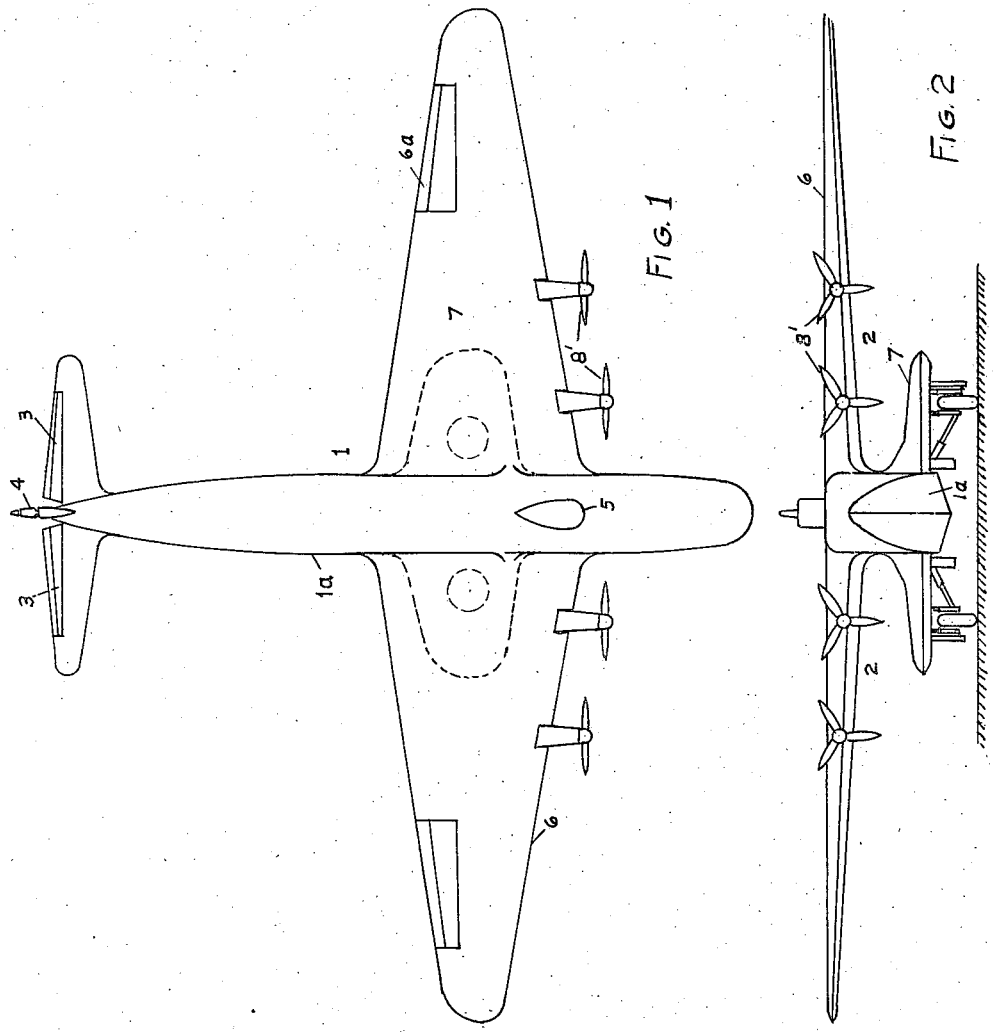
INVENTOR.
Edward E. Wallace

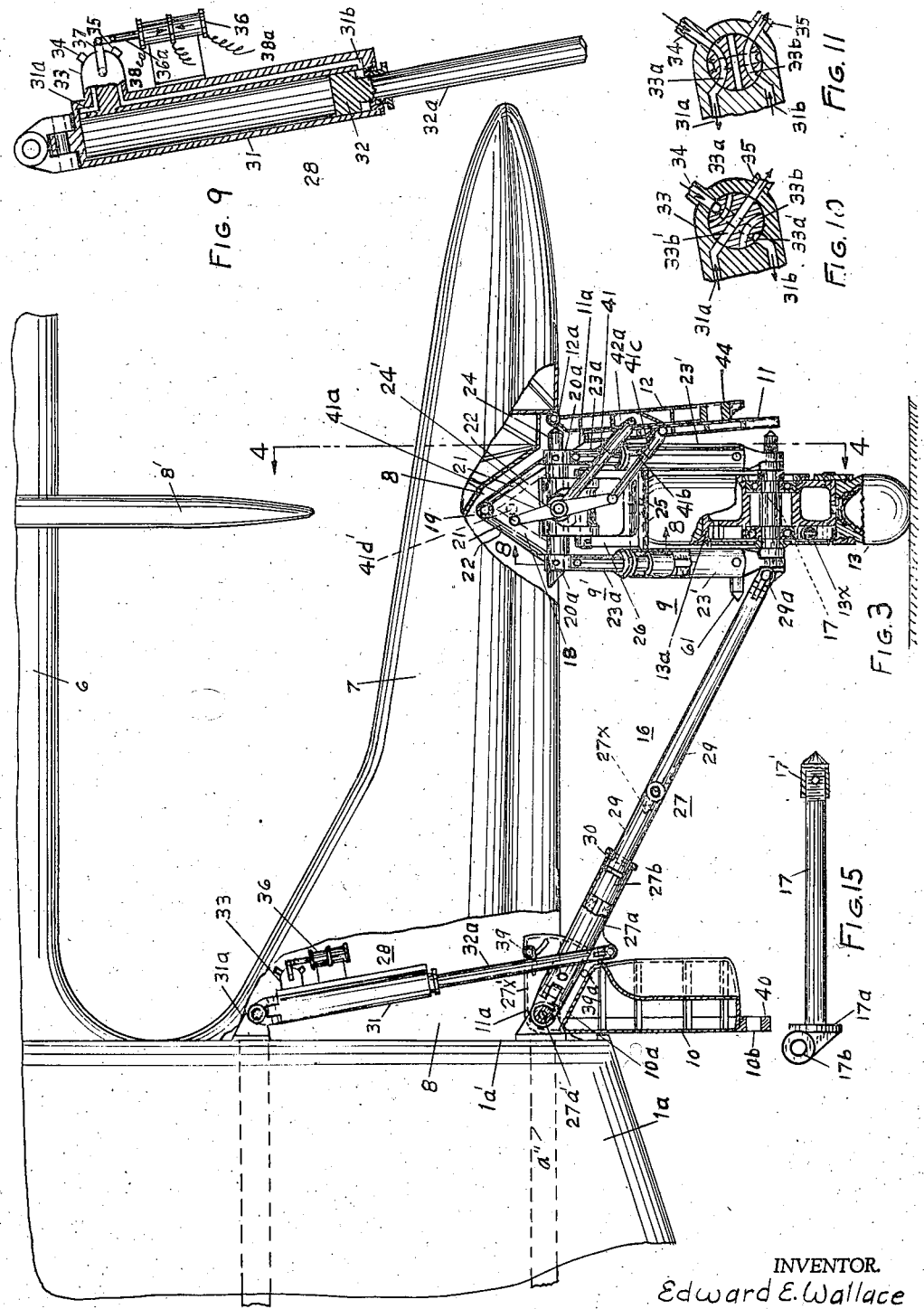

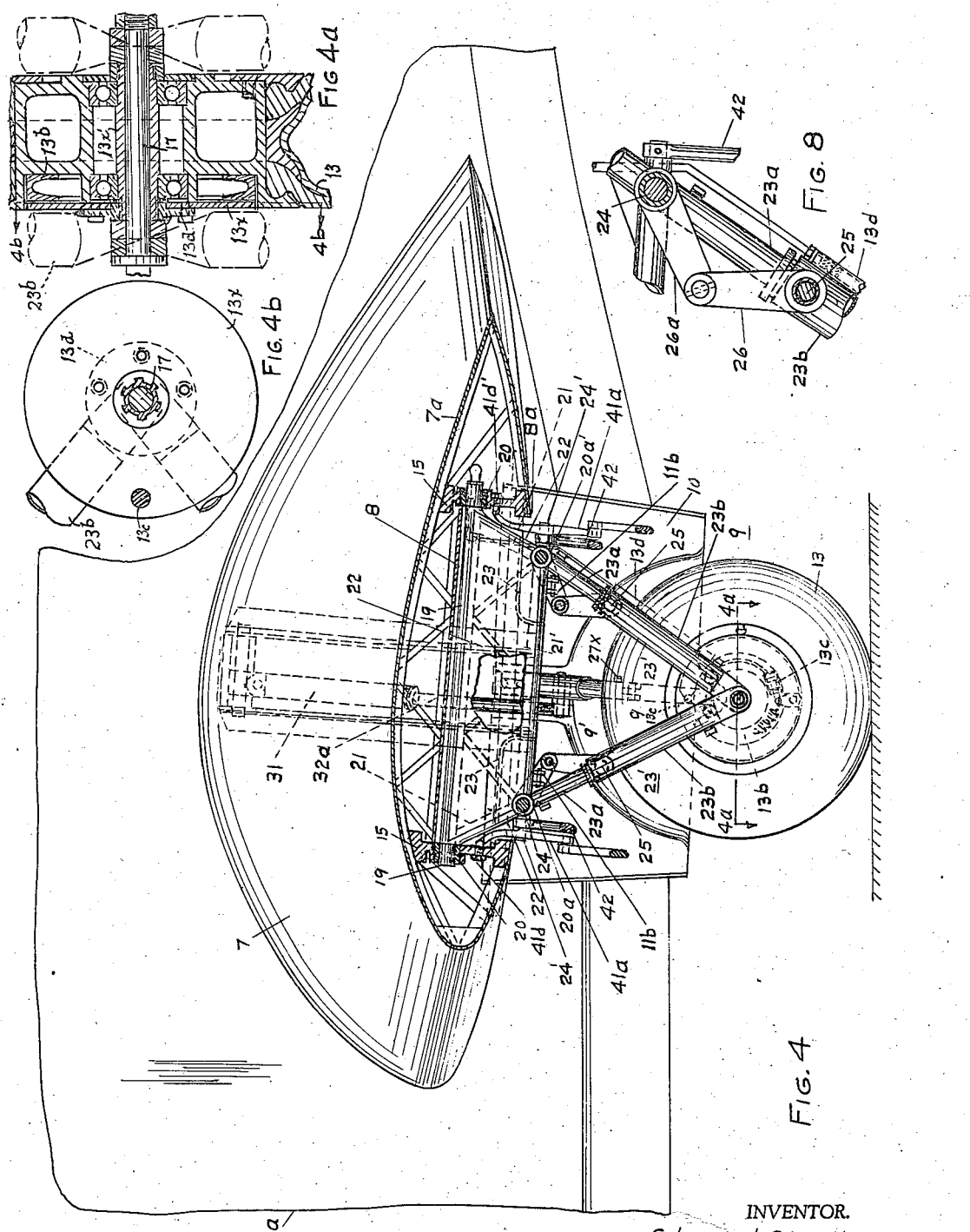

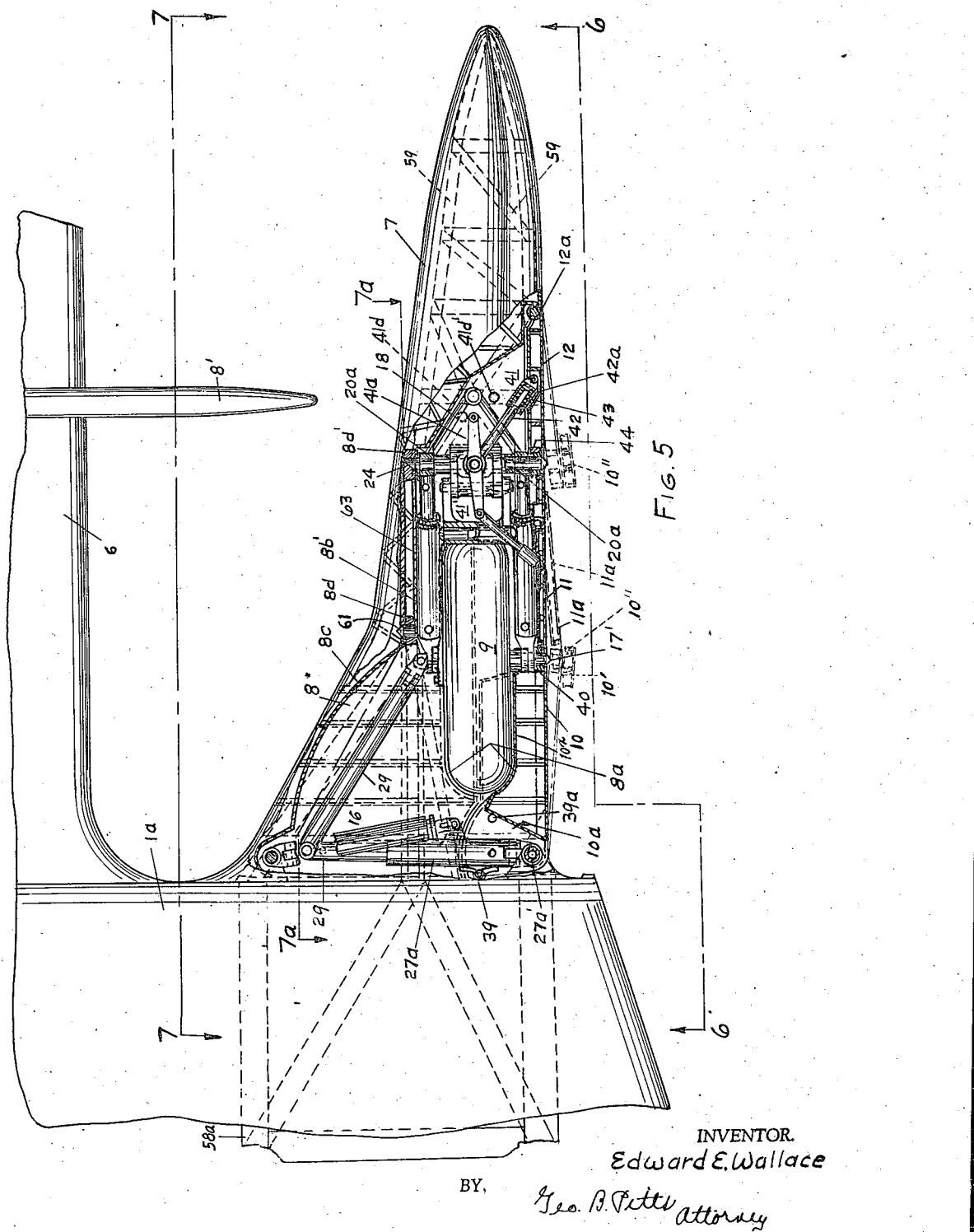

Feb. 11, 1947.     E. E. WALLACE     2,415,615
AIRPLANE
Filed Feb. 16, 1942     6 Sheets-Sheet 5
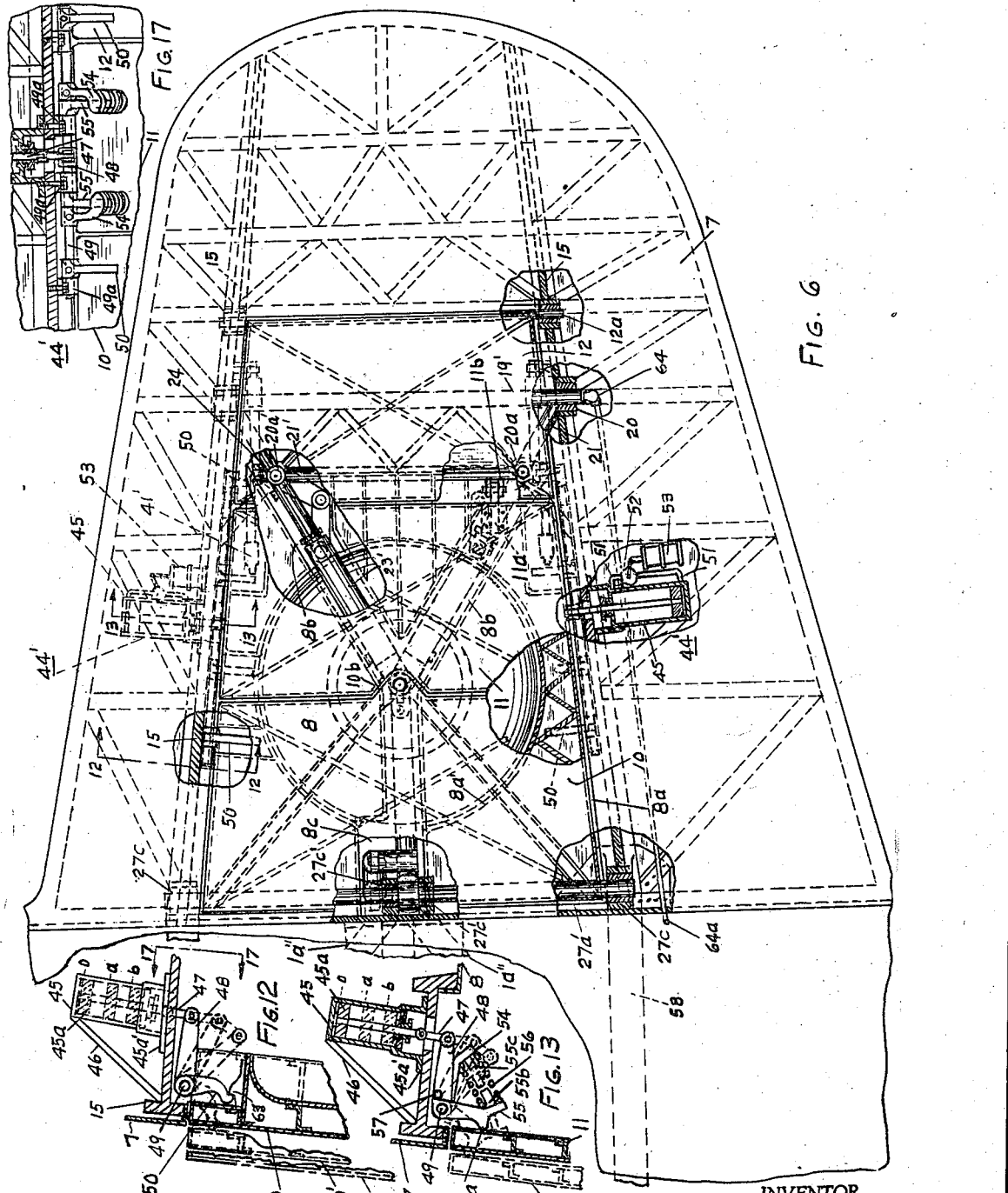
INVENTOR.
Edward E. Wallace

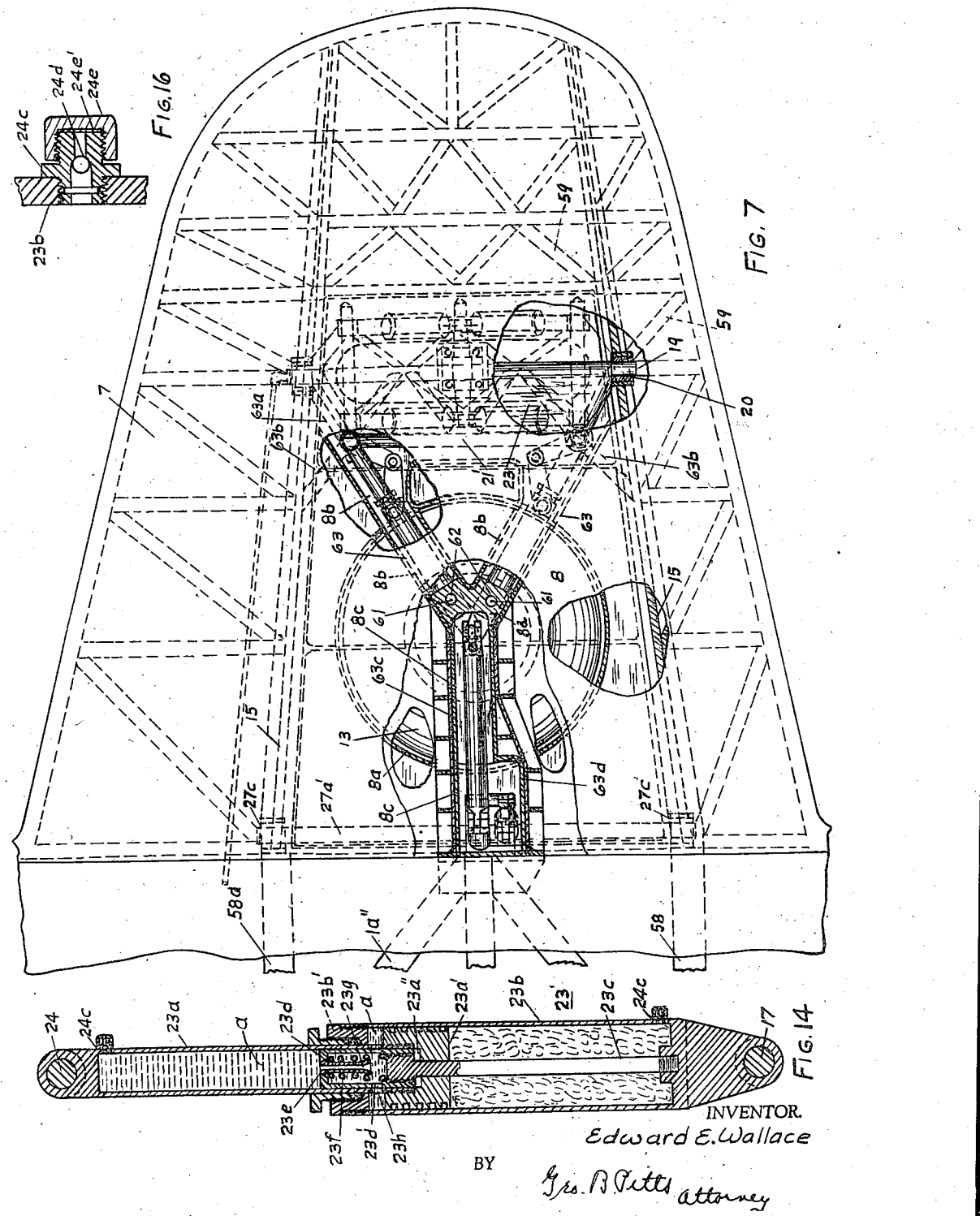

Patented Feb. 11, 1947

2,415,615

UNITED STATES PATENT OFFICE 2,415,615

AIRPLANE

Edward E. Wallace, Cleveland Heights, Ohio

Application February 16, 1942, Serial No. 431,102

23 Claims. (Cl. 244—102)

This invention relates to an airplane and its landing gear. The landing gear may be adapted to or incorporated in various types of airplanes, which are intended to land on and take off from land, for example, a low wing type of monoplane; or it may be adapted to and incorporated in airplanes which are intended to land on and take off from either land and water. However, the disclosure herein, in exemplification of the invention, consists of a sesqui plane of the amphibian type having my improved construction of landing gear incorporated therein.

In the use of the term "land," in referring to the surface utilized for take-off and landing purposes, I have in mind air-ports and other areas, decks of ships and platforms whether stationary or floating on water; also, the term "fuselage" used hereinafter comprehends that portion known as the hull in planes which are adapted to land in water.

One object of the invention is to provide an improved airplane having provision for landing on and taking off from land or water.

Another object of the invention is to provide an airplane having improved landing gears each comprising a wheel and mounting therefor having cushioning means and arranged when the airplane is landing or maneuvering to resist forces in directions substantially parallel and laterally relative to the longitudinal axis of the airplane.

Another object of the invention is to provide an improved airplane having landing gears retractible into the wing structure thereof for landing on and taking off from water and connections between the gears and wing structures arranged, when the gears are in retracted position, to reinforce the wing structures against distortion.

Another object of the invention is to provide an improved airplane adapted to land on and take-off from the surface of a body of water and having enclosed within its structure a landing gear which, at the will of the pilot, may be positioned to permit landing on and take-off from a surface other than water.

Another object of the invention is to provide an improved airplane having sponsons to permit landing on and take-off from the surface of a body of water, and incorporated in the sponsons, landing gears which may be moved into operative position to permit landing on and take-off from a surface other than water.

A further object of the invention is to provide an improved airplane capable of landing on and taking off from water and carrying within its wing structure in substantially water tight compartments, landing gears which may be moved into operative position for landing on and taking off from surfaces other than water.

A further object of the invention is to provide an improved airplane having a landing gear which may be retracted to a position within the airplane structure to eliminate wind resistance, and parasite drag.

A further object of the invention is to provide an improved landing gear for an airplane constructed to (a) resist pressure or strains transmitted laterally in either direction when the airplane is making a landing and (b) cushion the impact of the plane when landing and coming to a stop or complete rest.

Another object of the invention is to provide for an airplane an improved landing gear having a yieldable mounting which straddles the landing wheel and operates to resist stresses rearwardly directly and upwardly or forwardly and upwardly and a yieldable connection with the fuselage so as to resist lateral stresses independently of or in combination with the first referred to stresses, whereby the airplane accommodates itself to all stresses incident to landing operations.

A further object of the invention is to provide an improved airplane having retractile landing gears, the airplane having compartments for the landing gears and doors for each compartment articulatably connected with the adjacent landing gear and its operating mechanism, arranged to close the compartment when the landing gear is retracted thereinto.

Another object of the invention is to provide an improved airplane having sponsons each formed with a chamber and doors for each chamber, the walls of each compartment and its door being substantially complementary to the contour of the adjacent landing gear to minimize the volumetric capacity of each compartment to exclude intake of water when the airplane engages with or is floating on water.

Another object of the invention is to provide an improved airplane landing gear construction adapted for mounting in planes of various sizes and load carrying capacities.

Other objects of the invention will be apparent to those skilled in the art to which my invention relates from the following description taken in connection with the accompanying drawings, wherein Fig. 1 is a plan view of an airplane embodying my invention.

Fig. 2 is a front elevation.

Fig. 3 is a fragmentary front elevation, enlarged and parts being broken away; the landing gear at one side of the airplane being shown in operative position.

Fig. 4 is a section on the line 4—4 of Fig. 3.

Fig. 4a is a section on the line 4a—4a of Fig. 4.

Fig. 4b is a section on the line 4b—4b of Fig. 4a.

Fig. 5 is a view similar to Fig. 3, but showing the landing gear in retracted position; parts being broken away.

Fig. 6 is a bottom plan view on the line 6—6 of Fig. 5, parts being broken away.

Fig. 7 is a top plan view on the line 7—7 of Fig. 5, parts being broken away.

Fig. 8 is a fragmentary sectional view on the line 8—8 of Fig. 3.

Fig. 9 is a fragmentary sectional view of one of the cylinders, piston and valve mechanism for operating one wheel and its mounting.

Figs. 10 and 11 are sectional views of one of the valves for controlling the flow of fluid under pressure to a cylinder.

Figs. 12 and 13 are fragmentary sections of the lines 12—12 and 13—13, respectively, of Fig. 6.

Fig. 14 is a sectional view of one of the supporting members, enlarged.

Fig. 15 is a side elevation of the wheel axle, the cap thereon being broken away.

Fig. 16 is a detail sectional view (enlarged) for one of the supporting members.

Fig. 17 is a fragmentary view on the line 17—17 of Fig. 12.

In the drawings, 1 indicates as an entirety an airplane comprising a fuselage 1a and wing structures 2, 2, at opposite sides of the fuselage, elevators 3 and a rudder 4. 5 indicates the cock-pit. Each wing structure 2, in the type of airplane disclosed, consists of an airfoil 6 having an aileron 6a and a sponson 7. In the form of airplane disclosed, it is designed to have a gross weight of 400,000 pounds. The airfoil span is approximately 260 feet, the overall length approximately 185 feet and a height (when the landing gear is in operative position—see Fig. 2) approximately 45 feet; accordingly, this size of airplane makes it necessary to provide it with more than one engine, for which reason I have shown mounted on each airfoil 6 two propellers 8', which may be drivingly connected to one engine or each propeller driven by one or more engines; the engine or engines also being suitably mounted in the adjacent airfoil 6 or adjacent thereto.

It will be understood that the airplane may be of any desired size and that the number of engines required will depend upon the size of the plane and other factors.

The parts above referred to, except the sponsons 7, may be of any desired shape and form of construction and the engines and propellers may be variously mounted, as they form no part of the present invention. As will be apparent, (a) the engines, (b) controls for and connections to the elevators 3, rudder 4, ailerons 6a and the engines, (c) flying instruments, such as gages and the like and (d) gas and oil tanks, pumps and electrical and other equipment, are not shown as these parts, accessories and equipment may be of any well known construction and form no part of the present invention.

The exterior walls of the fuselage 1a and airfoils 6 may be formed of suitable material, such as sheet metal having an aluminum base or alloy steel or plastic, to insure lightness, and these walls may be related, braced and reinforced, in connection with the various equipment carried therein, in any desired manner.

The exterior walls 7a of each sponson 7 are preferably formed of sheet metal having an aluminum base or alloy steel or plastic, whereas the truss and the bracing and reinforcement elements within these walls, are arranged to accommodate or provide for a chamber or compartment 8, which receives and completely encloses a landing gear, indicated as an entirety at 9 (as shown in Figs. 3 and 5). As illustrated, the side and bottom walls of the compartment 8 are suitably supported within the adjacent sponson 7 in relation to an opening 8a provided in the bottom wall thereof, whereby the landing gear 9 may be swung to an operative position (see Figs. 2, 3 and 4) when the airplane is to land on land.

When the airplane is in flight, the landing gears 9 may be and preferably are retracted into the compartments 8 to eliminate parasite drag; they also occupy this position when landing on water and maneuvering on and taking off therefrom. Doors 10, 11 and 12 (later referred to) are provided for closing and substantially sealing each compartment 8 after the adjacent landing gear is moved thereinto. Each of the doors 10, 11 and 12 is interiorly reinforced to insure rigidity thereof; this construction enables the doors 10 and 12 to adequately resist tensile stresses under conditions later set forth. The walls of each compartment 8 and the inner walls of the doors are preferably shaped to closely fit the adjacent landing gear 9, including its swinging devices, as later set forth, so that a minimum space in the compartment around the landing gear exists for water which may leak through or between the joints for the doors 10, 11 and 12 or between the latter and the side walls of the opening 8a.

The walls of each compartment 8 are suitably connected to the spars of the adjacent sponson and walls of the latter and fuselage so as to prevent leakage of water from the compartment into the sponson or fuselage, in the event water leaks into the compartment through the joint of its closures.

The landing gears 9 in the sponsons 7 are similar in construction, so that the description of one will suffice for both. They are preferably simultaneously operated to and from the compartments 8 by fluid operated means, which may be controlled by a single operating device (not shown) suitably positioned for operation by the pilot.

Each landing gear 9 comprises a wheel 13 (preferably of the pneumatic tired type), a mounting indicated as an entirety at 9' for the wheel swingably mounted at its inner end on and between spaced spars 15 within and extending longitudinally of the adjacent sponson 7 and an operating mechanism, indicated as an entirety at 16 (see Fig. 3), for swinging the mounting 9' in either direction, such mechanism also, by preference serving to operate the doors 10, 11 and 12, so as to automatically close the opening 8a when the landing gear 9 is moved into the adjacent compartment 8 and to automatically open the doors when the landing gear is moved to its operative position.

The wheel 13 is mounted on an axle 17 which is provided with suitable anti-friction bearings (see Figs. 3, 4a), the opposite ends of the axle being secured to the lower end of the mounting 9'. Of the mounting 9', 18 indicates a truss-like member consisting of (a) a hollow bar or tube 19 the opposite ends of which rotatably fit bushings 20 suitably mounted in the spars 15 (see Figs 4 and 6), to swingably mount the mounting 9' on the adjacent sponson 7, (b) pairs of integral, diverging hollow bars or tubes 21 extending from the opposite end portions of the bar 19 in a direction inclined toward each other and (c) a hollow bar or tube 21' extending between and rigidly connected to each bar 21 of one pair of bars and the corresponding bar 21 of the other pair thereof. Plates 22 are secured (as by welding) to the bars 19, 21 and 21' on the opposite lateral sides of the member 18 and to the outer sides of each pair of bars 21 at the opposite ends of said member, and a plate 23 is secured (as by welding) to the bars 21' and 21 and plates 22, these plates serving to sealingly close the space within the truss member 18 so as to reduce the water holding capacity of the adjacent compartment 8 when the adjacent landing gear is retracted thereinto. The outer ends of each pair of bars 21' terminate in aligned knuckles 20a, 20a', in which is mounted a cross pin 24 the opposite ends of which extend outwardly beyond the knuckles for purposes later set forth. Each pin 24 is fixedly secured, in any well known manner, to either one or both of the adjacent knuckles 20a, 20a', to prevent its rotation. 23' indicates pairs of supporting members at opposite sides of the wheel 13 and connecting the axle 17 to the truss member 18. In this arrangement the wheel 13 is supported in a plane which cuts the axis of the tube 19. Each supporting member 23' consists of a plunger 23a, having on its inner end a piston 23a' (see Fig. 14) and a cylinder 23b into which the plunger telescopes. Each cylinder 23b is filled with air under pressure and oil under pressure above the piston (for example, air at approximately 500 lbs. initial pressure per square inch and oil under the same pressure as later set forth) to cushion the inward movement of the plunger. The side wall of the cylinder is formed with a screw threaded opening in which is mounted the inner threaded end of a nipple 24c, through which the cylinder may be charged with air (see Fig 16). The bore through the nipple is shaped to form a seat for a valve 24d. The outer end of the nipple 24c is externally threaded to receive a removable screw cap 24e, which may be tightened against a gasket 24e' to seal the nipple. The outer end of each plunger 23a is pivotally mounted on the end portion of the adjacent pin 24, whereas the outer end of each cylinder 23b is pivotally connected to the adjacent end portion of the axle 17. The outer ends of the cylinders on the inner side of the wheel 13 are disposed between the adjacent side wall 13x of the wheel 13 and a shoulder 17a on the adjacent end of the axle 17 (see Fig. 15) and the outer ends of the cylinders on the outer side of the wheel 13 are disposed between a sleeve on the axle 17 and the inner end of a cap 17', which has screw threaded engagement with the adjacent end of the axle 17, the cap being pinned to the axle after the cylinders are mounted thereon. It will be observed that, due to the relative movements of the plungers 23a in their respective cylinders 23b and the pivotal connections of the plungers to the truss member 18 and pivotal connections of the cylinders to the axle 17, the mounting 9' provides (a) for relative vertical movements between the wheel 13 and with respect to the trussmember 18 and (b) for swinging movement of the wheel relative to the latter, in a direction substantially at right angles to the adjacent sponson 7, whereby the wheel 13 yieldingly accommodates itself to forces which result in making a landing or maneuvering on land to insure safety and eliminate damages to the landing gear and airplane. Each supporting member 23' at one side of the wheel 13 is connected to the corresponding supporting member 23' on the opposite side of the wheel to insure simultaneous relative telescoping movement of the plungers and cylinders of these connected-together members. For this purpose, the cylinder 23b at each side of the wheel 13 is provided with an inwardly extending rod 25 alined with the rod 25 on the corresponding cylinder 23b at the opposite side of the wheel (see Figs. 3 and 8), and pivotally mounted on these rods 25 and the adjacent pin 24 is a pair of links 26, 26a, pivotally connected together at their inner ends (see Fig. 8). As will be observed, as the rods 25 extend into the knuckle for the link 26, the related members 23' are tied together in fixed relation. As shown in Figs. 3 and 5, the knuckle for the link 26 has a width substantially equal to the spacing of the adjacent cylinders 23b, so as to engage therewith as the link rocks on the rods 25, and thus maintain the links centrally of the adjacent wheel 13. It will also be observed that the supporting members 23' are disposed equal distances from an imaginary plane which cuts the adjacent bar 19 and center of the wheel (the central plane extending at right angles to the axle 17), so that all forces against or transmitted through the wheel perpendicularly of the adjacent sponson are always in line with the bar 19.

As shown in Fig. 4a, the wheel 13 is provided with a hub which rotates on a sleeve 13x' (suitable anti-friction bearings being provided between the hub and sleeve) and the sleeve in turn is free to rotate on the shaft 17. At its inner end the sleeve 13x' is splined to the annular plate 13x, which supports the pivot 13c for brake shoes 13b. 13d indicates a plate bolted to the wall 13x, the plate being welded to the adjacent knuckle for one of the cylinders 23b (Fig. 4a), whereby the wall 13x is held against rotative movement except as may be incident to the operation of the members 23'.

As shown in Fig. 4, when the parts of the mounting 9' are in normal position the pistons 23a' for each member 23' is disposed at the outer end of the adjacent cylinder 23b, to limit the extensibility of the member 23'. Accordingly, each of the supporting members 23' is constructed to retard movement of the plunger 23a outwardly of the adjacent cylinder 23b. For this purpose, the plunger 23a is of hollow construction (see Fig. 14) and filled with liquid, such as oil a (under pressure as already set forth), which in the inward movement of the plunger and its piston, is forced into the cylinder 23b behind the piston 23a' and in the outward movement of the plunger and its piston, the latter forces the liquid through a restricted by-pass back into the plunger, the restricted return flow of the liquid serving to prevent a rapid rebound of the parts connected to the plunger 23a. The control of the liquid from the plunger 23a into the cylinder 23b and from the latter back into the plunger is provided for by the following devices: 23c indicates a rod axially supported in the cylinder 23b, its outer end being threaded into an opening formed in the outer end wall of the cylinder. The rod 23c extends through an opening formed in the piston 23a' and is provided at its inner end with a head to which is secured the outer end of a casing 23d. As shown in Fig. 14, the head on the rod 23c is externally threaded and the casing 23d is internally threaded, whereby these parts are adjustably connected together and the casing fixedly supported relative to the cylinder 23b. By preference the piston 23a' is formed with a recess 23a'', which accommodates the lower end of the casing 23d to permit a maximum stroke of the piston, the side wall of the recess 23a'' being threaded and the inner end of the plunger 23a having screw threaded connection therewith and arranged to form between the piston 23a' and closure 23b' for the cylinder 23b, when the parts are in normal position, a space for a portion of the liquid a. The end wall of the casing 23d is provided with a normally closed escape valve 23e for the liquid a, so that in the inward movement of the plunger 23a, the pressure of the liquid a therein will open the escape valve and permit the liquid to flow into the cylinder 23b, the casing 23d being formed with ports 23d' to permit such flow of the liquid. The valve element of the escape valve 23e is normally biased into engagement with its seat by a coiled spring 23f surrounding the shank and the valve element and abutting the head thereof and the inner end of the head on the rod 23c. As shown, the valve element of the escape valve 23e and its shank are formed with a through duct 23g which forms a restricted by-pass for the liquid a in the return stroke of the piston 23a' to retard the movement of the plunger 23a. The duct 23g also permits flow of the liquid a to and from the plunger 23a when the latter and the cylinder are in normal position to equalize the pressure therein, the side wall of the plunger 23a being formed with ports 23h above the piston 23a' to provide a communication between the plunger 23a and cylinder 23b. The oil a is supplied to each plunger 23a through a nipple 24c (see Fig. 16) which is similar in construction to the nipple through which air is supplied to the cylinder 23b.

The mechanism 16 for swinging each mounting 9' and the wheel 13 supported thereby from the adjacent compartment 8 to its operative position and in the reverse direction comprises a linkage 27 extending between and connected to the adjacent side wall 1a' of the fuselage 1a within each sponson 7 and the adjacent mounting 9' and fluid operated means 28 for operating the linkage. The linkage for operating each mounting 9' is arranged to and operates in a vertical plane co-incident with the axis of the axle 17 and at right angles to the shaft 19. The linkage consists of a cylinder 27a pivoted at its inner end by means of a universal joint on a shaft 27a', a piston 27b slidable in the cylinder and a sectional rod 29 between the piston 27b and wheel axle 17. The sections of the rod 29 are pivoted together for articulation, as shown at 27z, whereby they may be folded or collapsed, as shown in Fig. 5 or moved into an end-to-end relation to each other and the cylinder 27a, as shown in Fig. 3. The inner section of the rod 29 is connected at its outer end to the piston 27b, whereas the outer end of the outer section of the rod is pivotally connected to the mounting 9', by means of a universal joint 29a which is connected to knuckles 17b on the inner end of the axle 17. The cylinder 27a, piston 27b and adjacent rod section are preferably similar in construction to like parts forming each of the members 23' (Fig. 14). The cylinder 27a is filled with a fluid, such as air under substantially 500 pounds initial pressure, and oil under the same pressure, the air serving to cushion the piston 27b when moved inwardly and the oil serving as a retarding means in the return direction. The wall of the rod section connected to the piston 27b is provided with a valved inlet or nipple 27x (see Fig. 4) for filling it with oil and the wall of the cylinder 27a is provided with a valved inlet or nipple 27x' (see Figs. 3 and 5), whereby the cylinder may be filled with air at the desired pressure. The outer end of the cylinder 27a is provided with an internal collar (similar to collar 23b' shown in Fig. 14) to form with the piston 27b a chamber or space for oil which serves to limit the outward movement of the rod 29, the length of the linkage 27 being so arranged that when the piston 27b is arrested, (a) the mounting 9' is in vertical position and held against movement outwardly beyond the vertical or in perpendicular relation to the adjacent sponson and (b) the rod 29 and cylinder 27a are disposed in end-to-end relation in alinement with the knuckles 17b on the axle 17 (see Fig. 15) and shaft 27a' and held against articulation by the operating means 28. Accordingly, any forces imparted to or through the wheel 13 laterally inwardly, for example, side landing on both wheels or one wheel, will be cushioned by the fluid in the cylinder 27a due to inward movement of the piston 27b. The shaft 27a' extends through the side walls of the compartment 8 and has bearing in bushings 27c which are mounted in the spars 15. Intermediate its ends, the shaft 27a' is mounted in spaced bushings 27c' (see Fig. 6) which are suitably supported at opposite sides of the cylinder 27a on the side wall 1a' of the fuselage 1a, this wall being reinforced by bracing elements 1a''. The fluid operated means 28 consists of a cylinder 31 (Figs. 3 and 9) pivotally connected by means of a universal joint at its outer end to a bracket 31a, which is suitably fixed to the side wall 1a' of the fuselage 1a within the compartment 8, and a piston 32 within the cylinder (see Fig. 9) and operated by fluid under pressure, such as oil. The piston 32 is connected to a pitman 32a the outer end of which is pivotally connected by means of a universal joint to a stud or pin extending laterally at one side of the cylinder 27a outwardly of the shaft 27a' and is arranged to operate therethrough to swing the linkage 27 from the position shown in Figs. 2 and 3 to the position shown in Figs. 5, 6 and 7, or from the latter position to the position shown in Fig. 3. The wall of the cylinder 31 is formed with two conduits 31b, 31b', leading from the opposite ends thereof to a four-way valve 33, the valve element of which (a) in one predetermined position, by means of a duct 33a, connects the conduit 31b with a supply pipe 34 leading from the source of fluid supply under pressure and by means of a duct 33b, connects the conduit 31b' with an outlet or discharge pipe 35 leading to a sump (not shown) and (b) in another predetermined position, by means of a duct 33a', connects the conduit 31b' with the supply pipe 34 and, by means of a duct 33b', connects the conduit 31b with the discharge pipe 35. Accordingly, when oil is supplied to the cylinder at one side of the piston 32, the oil therein on the other side of the piston is discharged from the cylinder. The valve element of the valve 33 is rotated to and from either predetermined position by a double acting solenoid 36 having two coils and a core 36a pivotally connected to an arm 37, which is connected to the valve element of the valve 33 for operating it. To effect such operation, the coils of the solenoid 36 are connected in electrical circuits 38, 38a, having control switches (not shown) arranged to alternately close the circuits, whereby one coil is energized and the other simultaneously de-energized. In the operation of the fluid operated means 28, oil admitted to the cylinder 31 through the duct 31b will move the piston 32 outwardly to the position shown in Fig. 9, and through the pitman 32a swing the landing gear from the compartment 8 (see Fig. 5) to its operating position, as shown in Figs. 2, 3 and 4; and when oil is admitted to the cylinder 31 through the duct 31b', these parts will be moved in the opposite direction to retract or swing the landing gear into the compartment 8.

From the foregoing description it will be observed that the inner end of each cylinder 31 and the inner end of each cylinder 27a are connected to the fuselage by universal joints, which not only permit the movement thereof in vertical planes, but also fore and aft with respect to the adjacent sponson 7; also, that the inner section of the rod 29 is held against upward movement when the adjacent landing gear is in operative position (as shown in Fig. 3). Accordingly, when the parts are in this position the outer pivoted end 27z of the inner section of the rod 29, while capable of fore and aft swinging movements due to their universal joint connection with the fuselage, is held against vertical movement; but due to the pivotal connection 27z between the inner and outer sections of the rod 29, the latter section is capable of swinging movement about the pivot 27z vertically.

It is therefore obvious that the wheel 13 can move fore and aft relative to the hull or fuselage and sponson when contacting the ground, since either pair of members 23' (front or rear), which straddle the wheel, can compress or shorten while the other pair of members may or may not compress or shorten; also, both pairs of front and rear members 23' may—probably in most landing operations—compress or shorten simultaneously; also, where the above referred to conditions are present and the airplane has made a side landing with a thrust inwardly toward the hull or fuselage on one of the airplane wheels, the rod 29 and piston 27b would shorten relative to the cylinder 27a and fuselage and thus permit movement of the wheel and its mounting inwardly relative to the fuselage. It will, accordingly, be observed that by reason of the cushioning devices between each wheel and the adjacent sponson and fuselage, the airplane is free to swing on circular lines about the point of contact of the wheel with the landing surface, within the limits of the compressive movements of the members 23' and rod 29, when the airplane is making a landing to cushion the resulting impacts and thereby minimize the discomfort to passengers in the airplane and damage thereto.

The doors 10, 11 and 12 related to each sponson are arranged to close the adjacent compartment 8 to facilitate landing on water and to prevent the intake of water when the sponsons are in engagement therewith. In closed position, the doors complete the bottom surface of the adjacent sponson to reduce parasite drag when the airplane is in flight or maneuvering on water. Due to the danger of intake of water around the edges of the doors when landing on water or the sponsons are in engagement therewith, I prefer to shape and relate the walls of each compartment 8 to closely fit over and around the wheel 13, its mounting 9' and the devices for operating the wheel and mounting into and from the compartment, whereby, when these parts are in retracted position and the doors 10, 11 and 12 are closed, minimum space exists within the compartment to receive and hold water. Therefore it will be seen that while the landing gears are carried in the sponsons and are operated at will to landing and take-off position, provision is made for excluding water from the sponsons when the landing gears are mounted in their respective compartments; furthermore, if intake of water takes place, the openings which permit such intake, will provide for drainage of the water as soon as the plane is in flight. The walls of each compartment are shaped to form a cavity or recess 8a' fitting over the wheel 13 and its mounting, diverging recesses 8b for the inner side members 23' of the mounting 9' and a recess 8c for the linkage 27 and fluid operating means 28, whereas the inner wall of the door 10 is shaped, as shown at 10x, to take up the space below the wheel between its axle and the adjacent wall 1a' of the fuselage. The walls of the recesses 8b form a triangular truss between struts of the sponson 7 as later set forth.

Each door 10 is interconnected to the adjacent landing gear operating means for movement with the adjacent landing gear so as to move with the latter in either direction and the adjacent doors 11 and 12 are interconnected to the adjacent mounting 9' to swing therewith in either direction. However, means are provided, as later set forth for initially opening the doors 10, 11 and 12 to a predetermined position (see dotted lines in Fig. 5) in advance of the operation of the landing gear to its operative position and in the movement of the landing gear into the adjacent compartment, for arresting the doors in this position.

Each door consists of inner and outer walls having suitable bracing and reinforcing elements between them.

As shown in Fig. 6, the door 10 is preferably fixed to the shaft 27a'. Intermediate its side edges, the inner wall of the door 10 is shaped to form a recess 10a to accommodate the inner end of the cylinder 27a, which is pivotally mounted on the shaft 27a', as already set forth, and the connection between the cylinder 27a and pitman 32a. One side wall of the recess 10a is provided with spaced abutments 39, 39a, disposed upon opposite sides of and in the path of movement of the cylinder 27a. Accordingly, when the fluid operated means are operated to operate the linkage 27 to move the landing gear outwardly, the cylinder 27a will engage the abutment 39a and swing the door 10 to its open position (see Fig. 3) and when the linkage 27 is operated in the reverse direction the cylinder 27a will engage the abutment 39 to swing the door 10 with the landing gear toward its closed position into engagement with an initial door opening means to be later referred to (see Fig. 5). The abutment 39 preferably comprises a spring which is put under tension as the cylinder completes its movement following the engagement of the door 10 with the initial door operating means. The spring 39 also permits the door 10 to move relative to the cylinder 27a when operated by the initial door operating means, as later set forth, to the positions shown in Figs. 5 and 12. As shown in Fig. 3, the free end of the door 10, midway between its side edges, is provided with an extension 10b (the adjacent edge of the door 11 having a complementary recess to receive the extension 10b) in which is fixedly mounted a ring 40 adapted to telescope over the cap 17' on the extended outer end of the wheel axle 17, in the final movement of the door 10 into closed position, for a purpose later set forth.

The door 11 is provided on its inner side with spaced arms 11a (see Figs. 3, 4 and 6) each of which is hinged on a pair of lugs 11b provided on the adjacent bar 21' of the truss member 18 (see Figs. 4 and 6), whereas the door 12 is fixed to a shaft 12a, the opposite ends of which are mounted in suitable bearings provided in the spars 15 (see Fig. 6). The door 12 has fixedly incorporated in its structure a pair of rings 44 adapted to telescope over the outer extended ends of the adjacent pins 24 in the final movement of the door 12 into closed position, for a purpose later set forth.

41 indicates as an entirety operating connections between each mounting 9' and the adjacent door 12 and 41' indicates as an entirety operating connections between each mounting 9' and the adjacent door 11, whereby the doors 11 and 12 swing with the mounting in either direction.

The connections 41 comprise pairs of telescopically related members, each pair consisting of a pitman 42 pivotally mounted at its outer end on the stud shaft 24' which is provided on the adjacent rod 24 and a cylinder 42a pivotally connected at its outer end to the door 12. As shown in Figs. 3 and 5, the outer sides of the links mounted on the rods 24 are formed with openings through which the stud shafts 24' extend, these openings being enlarged to permit free movement of the links. As will be understood from Fig. 5, the inner end of the pitman 42 is provided with a head slidably fitting the cylinder 42a and between the head and an annular wall on the inner end of the cylinder is interposed a coiled compression spring 43. In the movement of each mounting 9' to operative position the head on each pitman 42 engages the outer end wall of the adjacent cylinder 42a and operates therethrough to swing the door 12 to its open position; but in the movement of the mounting 9' in the opposite direction the pull by the pitman 42 is transmitted through the spring 43, to swing the door 12 to a predetermined position, in engagement with the initial door operating means, the springs 43 being put under tension as the mounting moves into its final retracted position, so that when the initial door operating means are operated the tension of the springs will serve to move the door into final closed position. The springs 43 also permit the door 12 to be moved outwardly by the initial door operating means to the predetermined position in advance of movement of the mounting 9'.

The connections 41' are provided between the opposite ends of the mounting 9' and the door 11 and each comprises a lever 41a pivoted intermediate its ends on the adjacent stud shaft 24' and a pair of telescopically related members 41b, 41c, having a compression spring between them. The members 41b, 41c, consist of a pitman pivotally connected at its outer end to one arm of the lever 41a and a cylinder pivotally connected at its outer end to the door 11. The related members 41b, 41c, are similar in construction and operation to the members 42, 42a, already described. The opposite end of the lever 41a is arranged to engage a stop 41d (see Fig. 5), so that in the movement of the landing gear into the compartment 8 the door 11 is engaged with and arrested by the initial door operating means, but in the further movement of the landing gear into final position, the stop rocks the lever 41d on the stud shaft 24', which through the members 41b, 41c, puts the spring between them under tension, so that when the initial door operating means are operated the tension of the springs will be effective to move the door 11 into final closed position. The springs also permit the initial door operating means to move the door 11 to the predetermined position in advance of movement of the mounting 9'. The opposite end of the lever 41a is also arranged to engage a stop 41d', as the mounting 9' moves into its final operative position, the effect of which is to rock the lever on the stud shaft 24' and through the telescopic members 41b, 41c, swing the door away from the mounting 9' (see Fig. 3), so that the members 23' will be free to operate when the airplane is making a landing or maneuvering.

Provision is made for incorporating each landing gear when in retracted position, with the structural and bracing elements of the adjacent sponson, whereby compression stresses on its upper side and tensil stresses on its lower side are adequately resisted. As will be observed from Figs. 5 and 7 the walls of the recesses 8b, 8c, are rigidly connected together and U shaped in cross section to form struts, the inner end of the walls of the recess 8c being connected to the fuselage side wall 1a' whereas its outer end and the adjacent ends of the recesses 8c are connected by struts 1x, 1x' (shown in dotted lines in Fig. 5), to the wall 1a', which in turn is connected to the struts 1a'', 58, 58a. The opposite or outer ends of the recesses 8b are rigidly connected to the struts thereof. As shown in Fig. 5, the bottom walls 8b' of the recesses 8b are spaced from the adjacent wall of the compartment 8. Between these walls and suitably fixed thereto at the inner ends of the recesses 8b I provide a plate 8d (Fig. 7) formed with through openings 62 into which project pins 61 provided on the inner side of the mounting 9', whereas between these walls at the outer ends of the recesses 8b, I provide rings 8d' which receive the inner projecting ends of the pins 24. The pins 61 are preferably formed integrally with and project from the side walls the inner cylinders 23b of the mounting 9' (see Figs. 3, 5 and 7). It will thus be seen that the structural arrangement of the walls forming the recesses 8b, 8c, and the struts 1x, 1x', of the adjacent sponson form a truss to resist compression stresses on the upper wall of the sponson due to contact of the landing gear with a landing surface. When the landing gear 9 is in retracted position, to permit landing on water, as the pins 61 are projected into the openings 62 and the adjacent pins 24 are projected into the rings 8d', it follows that the cylinders 23b and plungers 23a of the inner supporting members 23' are connected to the walls of the recesses 8b, so that the pressure of the fluid in these supporting members 23' serves to reinforce this truss construction. When each landing gear 9 is in retracted position and the doors 10, 11 and 12 move into final closed position, the ring 40 carried by the door 10 telescopes over the cap 17' and the rings 44 telescope over the outer pins 24, to interconnect the mounting 9' to the doors 10 and 12. As the outer supporting members 23' have a diverging relation and the pistons and cylinders forming these members are in normal position and cannot therefore be relatively extended, these members form a triangular truss between the doors 10 and 12, and as the door 10 is mounted on the fuselage wall 1a, which in turn is reinforced by the struts 1a, 58 and 58a and the door 12 is pivotally supported on the spars 15, these connected together parts serve to resist tensil stresses on the lower side of the sponson 7 when a landing is made on water.

44' indicates as an entirety the means, preferably operated by a fluid under pressure, for (a) initially moving the doors 10, 11 and 12 for each compartment 8 to a predetermined position, in advance of the movement of the adjacent landing gear from the compartment into operative position, (b) for arresting the doors at a predetermined position in the movement thereof toward their closed position to permit the adjacent landing gear to be retracted into the adjacent compartment in advance of the closing of the doors and (c) effect a closing of the doors after final movement of the landing gear. The purpose of the initial door operating means 44' is to strip the rings 40 and 44 from the mounting 9' in advance of movement of the latter from the compartment 8 to its operative position and in the movement of the landing gear in the opposite direction to stop the movement of the doors at the predetermined position to permit the mounting to be moved into its final position in the compartment 8 in advance of the final closing of the doors, so that the ring 40 may engage the cap 17' and the rings 44 engage the pins 24. Supplemental to the functions above set forth, the initial door operating means are utilized to break up any ice formation which may occur along the edges of the doors. I preferably provide fluid operated means at opposite sides of the openings 8a and control the operation thereof simultaneously to avoid distortion of the doors. The fluid operated means at opposite sides of the opening being similar in construction, only one thereof will be referred to as follows: 45 indicates a cylinder suitably secured to the adjacent spar 15 and braced by a stay 46 in each sponson at one side of the adjacent opening 8a and provided with a piston 45a connected to a pitman 47. The pitman 47 slidably extends through an opening formed in the adjacent spar 15. The outer end of the pitman 47 is pivotally connected to an arm 48 which is suitably fixed to a rock shaft 49. the shaft being mounted in bearings 49a secured to the adjacent spar 15 (see Fig. 17). The rock shaft 49, adjacent the outer end portion of each door 10 and 12, is provided with arms 50 arranged to engage the adjacent doors and swing them outwardly, to a predetermined position as shown in dotted lines at 10'' (see Figs. 5 and 12), the rings 40 and 44 being stripped from the cap 17' and rods 24 (see door position 10') in the movement of the piston 45a substantially one-half its full stroke to position a (Figs. 12 and 13). Also fixed to the shaft 49 is a pair of levers 54 each normally spaced from a pusher 55, but arranged upon rotative movement of the shaft 49 (as the piston moves from position a to position b), to engage the adjacent pusher 55 and through the latter, initially swing the door 11 to the position shown at 11a in dotted lines (Figs. 5 and 13). Each pusher 55 consists of a lever loosely fulcrumed on the shaft 49 adjacent one of the levers 54 and provided on its outer end with a downwardly extending foot 55a arranged to engage the door 11. On its upper side, the lever 55 is provided with an up-standing stud 55b alined with a depending stud 55c on the lower side of the adjacent arm 54 and arranged to be engaged by the latter stud to operate the pusher 55. An expansion spring 56 is coiled around the studs 55b, 55c, and abuts the arm 54 and lever 55 to normally maintain the pusher 55 in engagement with the door 11, the spring pressure between these parts serving to eliminate rattling thereof. In the arrangement and construction above described the levers 54 are substantially ineffective until the pistons 45a have moved to position b. Movement of each pusher 55 away from the arm 54 when the door 11 fully opens, is limited by a stop 57 mounted on the arm and arranged to be engaged by the tail of the pusher. The fluid for operating the piston 45a in either direction consists of liquid or air under pressure, supplied to the opposite ends of the cylinder 45 by conduits 51, connected to a valve 52, constructed similarly to the valve shown in Figs. 10 and 11, and operated by a double acting solenoid 53 (see Fig. 6), as shown in Fig. 9, whereby the fluid is supplied to one end of the cylinder and simultaneously discharged from its other end to operate the piston in the desired direction. Current supply for the coils of the solenoids 53 is controlled by a suitable switch or switches (not shown) to control the simultaneous movement of the pistons 45a in either direction.

It will be understood that the switches for the circuits which control the coils of the solenoids 36 and 53 may be operatively connected so that the initial door operating means must be operated in advance of the fluid operated means 28.

It will be observed that the springs 42 between the members 42 and 43, the corresponding springs between the members 41b, 41c, and the spring 39 permit the doors 10, 11 and 12 to be moved relative to the adjacent mounting and initially opened, as above described; also, that such initial movement of door 10 serves to put the spring 39 under tension and hence will exert pressure on the cylinder 27a to swing it outwardly, to supplement the power of the operating means 28 to operate the linkage 27.

By preference, the door 10 is provided with shoulders 63 (see Fig. 12) each of which is engaged by the adjacent arm 50 to lock the door in closed position when the piston 45a is in its outermost position (as indicated at 9 in Fig. 12), and is released when the pistons are moved inwardly to initially open the doors 10, 11 and 12.

When the landing gears 9 are to be moved to operative position, the initial door operating means 44' are first operated to swing the doors to the positions shown at 10'' and 11a and thereafter the landing gears are operated and they and cylinders 27a in turn swing the doors 10, 11 and 12 to their full open position. The initial door operated means remain in operated position so that in the movement of the landing gears into the compartments 8 the doors will be arrested by these means, while the landing gears continue to move into final position, such movement serving to put the springs 39, 43 and corresponding springs for the door 11 under tension. Following the final positioning of the landing gears 9, the pistons 45a are operated outwardly, which movement serves to release the doors so that the springs which have been put under tension, will effect a final closing of the doors and the arms 50 will move into engagement with the shoulders 63 to lock the door 10 closed. The valve for controlling the outward movement of the pistons 45a is arranged to effect a slow movement thereof to insure closing movement of the door 10 in advance of the adjacent arms 50.

As shown in Fig. 3, the inner wall of the wheel 13 is shaped to form a drum 13a closed by a side wall 13x and arranged to be engaged by shoes 13b (see Figs. 4, 4a and 4b) operated by a piston in a cylinder 13c, to which air under pressure is supplied through a tube 13d suitably fixed to an adjacent cylinder 23b; the cylinder being mounted on the side wall 13x. An air supply pipe 13e, which is suitably connected to the truss 18, telescopes into the tube 13d (see Figs. 4 and 8). The pipe 13e extends through the truss into the tubular shaft 21 and laterally outwardly into a casing 64 which rotatably fits the inner wall of the shaft 21 (see Fig. 6). The casing 64 is connected to a supply conduit 64a which leads from the source of compressed air.

It will be observed from the foregoing description that the doors 10 and 12 for each compartment 8 are initially moved in advance of the adjacent door 11. This arrangement and operation is advantageous where the initial door operating means are called upon to break up ice formation around the doors, since the pistons 45a may be reciprocated in their cylinders a distance less than half their full stroke and thereby effect hammer blows on these doors; likewise after the doors 10 and 12 have been loosened a similar operation may be imparted to the door 11.

To those skilled in the art to which my invention relates many changes in construction and widely differing embodiments and applications of the invention will suggest themselves without departing from the spirit and scope of the invention. My disclosures and the description herein are purely illustrative and are not to be in any sense limiting.

What I claim is:

1. In an airplane, the combination of a fuselage, wing structures at opposite sides thereof, each structure being formed with a chamber open on the lower side thereof, a landing gear arranged in substantially horizontal position in each of said chambers, each landing gear comprising a wheel having an axle and a mounting therefore pivotally connected to structural elements of the adjacent wing structure and the opposite ends of the axle for said wheel, the pivot for said mounting being disposed in the plane of said wheel and parallel to said fuselage, said mounting being movable to an operative position below and substantially perpendicularly to the adjacent wing structure, doors pivotally connected to said fuselage and each wing structure at opposite sides of each mounting and co-operatively related to close the adjacent opening, when the mounting is moved into the adjacent chamber, and a mechanism normally disposed in each of said chambers for substantially simultaneously moving the adjacent mounting out of its chamber into operative position and the adjacent doors to open position or in the reverse direction.

2. An airplane as claimed in claim 1, wherein separate means are provided for successively moving certain of said doors relative to the adjacent landing gear to predetermined initial positions in advance of movement of the adjacent mounting.

3. An airplane as claimed in claim 1 wherein separate means are provided for moving certain of said doors for each compartment relative to the adjacent landing gear to a predetermined initial open position in advance of the movement of the adjacent landing gear.

4. In an airplane, the combination with a fuselage and wing structures at opposite sides thereof each formed with a chamber open on the lower side thereof, of a landing gear arranged in substantially a horizontal position in each of said chambers, each landing gear comprising a wheel having an axle and a mounting therefor pivotally connected to structural elements of the adjacent wing structure on an axis disposed in the plane of the wheel and parallel to said fuselage, said mounting being swingable to an operative position below and substantially perpendicularly to the adjacent wing structure, and a mechanism normally disposed in each of said chambers for swinging the adjacent mounting out of its chamber into operative position or in the reverse direction, each said swinging mechanism including a member between and pivotally connected at its opposite ends to said fuselage and the inner end of said wheel axle and provided intermediate its ends with cushioning means arranged to resist thrusts on said wheel laterally inwardly when said mounting is in operative position.

5. In an airplane, the combination of a fuselage, wing structures at opposite sides thereof, each structure being formed with a chamber open on the lower side thereof, doors for closing the opening into each chamber, a landing gear in each chamber, comprising a mounting pivotally connected to the structural elements of the adjacent wing structure and a wheel mounted in said mounting, the pivot for each mounting being disposed in the plane of the adjacent wheel, a mechanism normally disposed in each chamber for moving the adjacent landing gear to an operative position below and substantially perpendicularly to the adjacent wing structure and into retracted position in said chamber, one of said doors being pivotally mounted on the side wall of said fuselage at the inner end of one opening and operatively connected to said mechanism and movable therewith into open and closed positions and another of said doors being pivotally mounted on said wing structure at the outer end of said opening and operatively connected to said mounting and operated thereby to open and closing positions.

6. In an airplane, the combination of a fuselage, wing structures at opposite sides thereof, each structure being formed with a chamber open on the lower side thereof, a landing gear in each chamber comprising a wheel having an axle, a truss-like member pivotally connected to structural elements of the adjacent wing structure within said chamber to swing on an axis parallel to said fuselage, a mounting supporting said wheel on said truss-like member for movement in a plane cutting said axis forwardly and rearwardly, said mounting consisting of a pair of yieldable supporting members at each side of said wheel, each pair being parallelly related to the other pair of supporting members, each member of each pair being pivotally connected to the adjacent end of the wheel axle and one outer end of said truss-like member, and means normally disposed in each chamber for moving the adjacent landing gear from said chamber to an operative position below and substantially perpen-

17 dicularly to the adjacent wing structure and into retracted position in the adjacent chamber.

7. An airplane as claimed in claim 6, wherein said moving means include relatively yieldable devices for resisting inward thrusts on said wheel laterally of said fuselage when the landing gear is in operative position.

8. In an airplane, the combination of a fuselage, wing structures at opposite sides thereof, each wing structure being formed with a chamber open on the lower side thereof, a shaft parallel to said fuselage mounted in each chamber, a landing gear normally disposed in each of said chambers and comprising a wheel having an axle, an elongated truss member swingably mounted on said shaft, yieldable connections between the opposite ends of the wheel axle and the opposite ends of said truss member, each said landing gear being movable to an operative position below and substantially perpendicularly to the adjacent wing structure, power mechanism, and a linkage connected to said fuselage and inner end of the wheel axle and operated by said power mechanism for moving the adjacent landing gear into operative position and in the reverse direction into the adjacent compartment, each said linkage being provided with shock absorbing means.

9. In an airplane, the combination of a fuselage, wing structures at opposite sides thereof, each structure being formed with a chamber open on the lower side thereof, doors hingedly mounted at the inner and outer ends of said opening, respectively, and swingable toward each other for closing each of said chambers, a landing gear in each chamber, comprising a mounting pivotally connected to the structural elements of the wing structure within the adjacent chamber and a wheel mounted in said mounting, mechanism in each of said chambers for moving the adjacent landing gear to an operative position below and substantially perpendicularly to the adjacent wing structure and into retracted position in said chamber, operating connections between said mounting and one of said doors for moving the latter to open position and into substantially closed position, and operating connections between said mechanism and the other door for operating the latter to open position and into a substantially closed position 10. In an airplane, the combination of a fuselage, wing structures at opposite sides thereof, each of said wing structures being formed with a compartment having an opening on the lower side of said wing structure, a landing gear mounted in each compartment and comprising a ground engaging member and a mounting therefor pivotally connected to structural elements of the adjacent wing structure to swing on an axis transverse thereto through the opening for said compartment to an operative position, mechanism for swinging each landing gear from its operative position into the adjacent compartment, and detachable connections between each of said mountings outwardly of the pivot on which it swings and said structural elements, when the adjacent landing gear is in its compartment, whereby each mounting cooperates with the structural elements of the adjacent wing structure and fuselage to resist compression stresses.

11. In an airplane, the combination of a fuselage, wing structures at opposite sides thereof, each of said wing structures enclosing a compartment having an opening on the lower side of said wing structure, a pair of doors for each of said compartments, pivotally mounted at their remote ends

18 on structural elements of the adjacent wing structure to swing downwardly, a landing gear in each of said compartments and comprising a ground engaging member and a mounting therefor pivotally connected to the structural elements of the adjacent wing structure to swing on an axis transverse thereto through said opening to an operative position substantially perpendicularly to the adjacent wing structure, mechanism for swinging each landing gear from its operative position into the adjacent compartment and the adjacent doors into closed position, and detachable connections between each of said mountings and the said adjacent doors, when said landing gear is in its compartment and the doors are closed, whereby each mounting co-operates with the structural elements of said fuselage and adjacent wing structure to resist tensil stresses on the latter.

12. In an airplane, the combination with a fuselage, of wings at opposite sides of said fuselage, sponsons below said wings at opposite sides of said fuselage, each sponson being provided with a compartment opening downardly, doors for closing the opening for each of said compartments, each of said doors being swingable on an axis parallel to said fuselage, a landing gear in each compartment consisting of a ground engaging member and a mounting therefor pivotally mounted within the adjacent sponson on structural elements thereof on an axis parallel to said fuselage, means within each compartment for swinging the adjacent landing gear into operative position and into said compartment, connections between one of said doors for each compartment and the adjacent swinging means for swinging the door to open position and closed position, and connections between the other door for said compartment and the adjacent mounting for swinging said other door to open position and closed position, the inner walls of each of said compartments and the doors therefor being shaped to closely fit around and over the adjacent ground engaging member, its mounting and the adjacent swinging means, when said landing gear is in said compartment, whereby excess space therein is eliminated.

13. In an airplane, the combination of a fuselage, wings at opposite sides thereof, sponsons below said wings at opposite sides of said fuselage, each of said sponsons being provided with a compartment having an opening on the lower side of said sponson, a landing gear in each of said compartments and comprising a wheel and a mounting therefor pivotally connected within and at that end thereof adjacent the outer end of the adjacent sponson on the structural elements of the latter to swing downwardly on an axis transverse to said sponson into operative position, and mechanism in each compartment for swinging the adjacent landing gear into the adjacent compartment, said mechanism being connected to the opposite end of the adjacent mounting and provided with cushioning means arranged to resist inward lateral thrusts thereon during landing operations on said landing gear.

14. In an airplane, the combination of a fuselage, wings at opposite sides thereof, sponsons below said wings and at opposite sides of said fuselage, each of said sponsons being provided with a compartment having an opening on the lower side of said sponson, a landing gear mounted in each of said compartments, each gear comprising an elongated truss member pivotally mounted within the adjacent compartment on structural elements of the adjacent sponson on an axis transverse thereto to swing downwardly to a position substantially perpendicularly to said sponson, a wheel having an axle and combined cushioning and shock absorbing devices between the opposite ends of the axle for said wheel and the opposite outer ends of said member, and mechanism in each of said compartments for swinging the adjacent landing gear into operative position and into the adjacent compartment.

15. An airplane as claimed in claim 14, wherein said shock absorbing devices consist of a pair of cylinders upon each side of said wheel pivotally connected at their outer ends to the wheel axle and filled with fluid under pressure, plungers filled with liquid under pressure, having pistons mounted in said cylinders of each pair thereof and a by-pass between each plunger and the adjacent cylinder, said plungers being pivotally connected at their outer ends to the opposite outer ends of said member.

16. An airplane as claimed in claim 14, wherein each of said mechanisms includes cushioning devices for the adjacent landing gear when in operative position.

17. In an airplane, the combination of a fuselage, wing structures at opposite sides thereof, a landing gear related to each wing structure, each landing gear comprising a member pivotally connected to structural elements of the adjacent wing structure to swing on an axis transverse thereto, a wheel having an axle, pairs of cushioning devices disposed upon opposite sides of said wheel between the opposite ends of said axle and the opposite outer ends of said member arranged to support the wheel in symmetrical relation to the axis of said member, and cushioning devices between the axle for each wheel and said fuselage arranged to resist inward thrusts laterally of the latter during landing operations.

18. In an airplane, the combination of a fuselage, wing structures at opposite sides thereof, landing gears at opposite sides of said fuselage, each landing gear comprising a wheel having an axle and a mounting therefor, each said mounting consisting of a rigid member disposed transversely of and pivotally connected to the adjacent wing structure inwardly of its outer end on an axis parallel to said fuselage, and a pair of supporting devices at each side of said wheel pivotally connected at their outer ends to the opposite ends of said axle for said wheel and pivotally connected at their inner ends to the opposite ends of said member, said pairs of devices being parallelly related in planes at opposite sides of an imaginary plane cutting said wheel and the pivot for said member, each of said devices consisting of a cylinder filled with fluid under pressure and a plunger having a piston movable in said cylinder to compress the fluid therein.

19. In an airplane, the combination of a fuselage, wing structures at opposite sides thereof, a landing gear disposed below each said wing structure and comprising a rigid member disposed transversely to said wing structure and pivotally connected to structural elements thereof, a wheel having an axle, and pairs of supporting members upon opposite sides of said wheel and pivotally connected to said axle and the opposite outer ends of said rigid member, each supporting member consisting of a pair of relatively movable cushioning elements to permit movement of said wheel forwardly and rearwardly relative to said rigid member in landing operations of the airplane, and linkage between each outer end of said rigid member and the adjacent supporting members on the opposite sides of said wheel for synchronizing the relative movement of said supporting members.

20. In an airplane, the combination with a fuselage having wing structures each formed with a compartment, a landing gear mounted in each compartment to swing on a shaft disposed transversely to said wing structure into operative position substantially perpendicularly thereto, each said landing gear including a member arranged to swing about the axis of said shaft, a wheel for engaging a landing surface and yieldable supporting members pivotally connected at their outer ends to the axle for said wheel and at their inner ends to said member, arranged to permit movement of said wheel forwardly and rearwardly relative to said wing structure during landing operations, and means for swinging each said landing gear from the adjacent compartment into operative position and in the reverse direction, each said swinging means consisting of inner and outer pivotally connected elements, the outer end of the outer element having a universal joint connection with the wheel axle and the inner end of the inner element being supported by a universal joint on the wall of said fuselage, and power means supported by a universal joint on the wall of said fuselage and operatively connected to said inner element, whereby said elements may be operated relative to said fuselage and each other to swing said landing gear to and from its operative position.

21. An airplane as claimed in claim 20 wherein the inner element of each said swinging means consists of shock absorbing devices.

22. In an airplane, the combination with a fuselage having wing structures each formed with a compartment, a landing gear mounted in each compartment and swingable on an axis transverse to the adjacent wing structure into operative position substantially perpendicularly thereto, each landing gear including a wheel for engaging a landing surface, a member pivotally connected to the wall of the adjacent compartment and diverging supporting members between the axle for said wheel and said pivoted member, means between said fuselage and each wheel axle for swinging the adjacent landing gear to and from its operative position, and inverted U-shaped walls fixedly mounted on the inner walls of each said compartment, one extending longitudinally of the compartment for receiving said swinging means and the others extending from the outer end of the first mentioned wall in diverging relation for receiving the diverging supporting members of the adjacent landing gear, said U-shaped walls serving as a truss to resist compression stresses on the upper wall of the adjacent wing structure during landing operations.

23. An airplane as claimed in claim 22 wherein the diverging elements of each landing gear consist of shock absorbing devices and detachable connections are provided between the opposite outer ends of each said element and the inner wall of the adjacent compartment, whereby said devices supplement the resistance of said truss when the landing gear is in said compartment.

EDWARD E. WALLACE.

REFERENCES CITED

The following references are of record in the file of this patent:

UNITED STATES PATENTS

| Number | Name | Date |
|---|---|---|
| 2,318,568 | Wintermute et al. | May 4, 1943 |
| 1,435,139 | Mummert | Nov. 7, 1922 |
| 2,296,117 | Pevney | Sept. 15, 1942 |
| 1,760,890 | Stout | June 3, 1930 |
| 2,180,462 | Seversky | Nov. 21, 1939 |
| 2,082,598 | Saulnier | June 1, 1937 |
| 1,904,281 | Ellingston | Apr. 18, 1933 |
| 1,685,122 | Carns | Sept. 25, 1928 |
| 1,721,935 | Thurston | July 23, 1929 |
| 1,737,596 | Lewis | Dec. 3, 1929 |
| 1,835,368 | Bellanca | Dec. 8, 1931 |
| 2,184,057 | Parker | Dec. 19, 1939 |
| 2,220,456 | Mercier | Nov. 5, 1940 |
| 2,222,975 | Brown | Nov. 26, 1940 |
| 2,224,571 | Dormier | Dec. 10, 1940 |
| 1,866,534 | Janin | July 12, 1932 |

FOREIGN PATENTS

| Number | Country | Date |
|---|---|---|
| 145,127 | British | June 21, 1920 |
| 396,609 | British | Aug. 10, 1933 |
| 691,667 | German | June 3, 1940 |
| 460,118 | French | Sept. 26, 1913 |
| 819,026 | French | June 28, 1937 |